(12) United States Patent
Ko

(10) Patent No.: US 8,757,568 B2
(45) Date of Patent: Jun. 24, 2014

(54) WALL MOUNT ASSEMBLY

(75) Inventor: Ming-Tsung Ko, New Taipei (TW)

(73) Assignee: AmTRAN Technology Co., Ltd, Jhonghe District, New Taipei (TW)

( * ) Notice: Subject to any disclaimer, the term of this patent is extended or adjusted under 35 U.S.C. 154(b) by 64 days.

(21) Appl. No.: 13/467,033

(22) Filed: May 8, 2012

(65) Prior Publication Data

US 2013/0256487 A1 Oct. 3, 2013

(30) Foreign Application Priority Data

Mar. 27, 2012 (TW) .............................. 101110542 A

(51) Int. Cl.
*A47F 1/14* (2006.01)
*A47G 1/16* (2006.01)
*A47F 5/00* (2006.01)

(52) U.S. Cl.
USPC ... 248/231.91; 248/917; 248/918; 248/475.1; 248/489; 248/496; 248/317; 248/497; 248/223.41; 248/224.8; 248/466; 248/320; 211/86.01; 211/87.01; 40/757; 40/759

(58) Field of Classification Search
USPC ......... 248/231.91, 917, 918, 475.1, 489, 496, 248/317, 497, 223.41, 224.8, 466, 320, 248/224.51, 224.61; 211/86.01, 87.01; 40/757, 759

See application file for complete search history.

(56) References Cited

U.S. PATENT DOCUMENTS

| 3,003,734 | A | * | 10/1961 | Davis et al. | 248/223.31 |
|---|---|---|---|---|---|
| 3,529,799 | A | * | 9/1970 | Schaefer | 248/496 |
| 4,315,615 | A | * | 2/1982 | Scocozza | 248/489 |
| 4,611,780 | A | * | 9/1986 | Robertson | 248/477 |
| 4,613,135 | A | * | 9/1986 | Rush | 473/488 |
| 5,425,524 | A | * | 6/1995 | Messina, Jr. | 248/475.1 |
| 6,481,679 | B1 | * | 11/2002 | Bennett et al. | 248/224.51 |
| 6,719,260 | B1 | * | 4/2004 | Hart | 248/479 |
| 7,216,841 | B2 | * | 5/2007 | Dodig, Jr. | 248/475.1 |
| 2005/0006554 | A1 | * | 1/2005 | DeLine | 248/475.1 |
| 2008/0083865 | A1 | * | 4/2008 | Matsui | 248/496 |
| 2010/0176261 | A1 | * | 7/2010 | Chen et al. | 248/231.91 |
| 2012/0327628 | A1 | * | 12/2012 | Shih | 361/807 |

\* cited by examiner

*Primary Examiner* — Terrell McKinnon
*Assistant Examiner* — Christopher Garft
(74) *Attorney, Agent, or Firm* — Winston Hsu; Scott Margo

(57) ABSTRACT

A wall mount assembly includes a first engagement member and a second engagement member. The first engagement member includes a slide structure and two positioning indentations oppositely disposed relative to the slide structure. The second engagement member includes a slider and two positioning bosses oppositely disposed relative to the slider. The first engagement member and the second engagement member are capable of being correspondingly disposed on an object and a wall. When the slider enters the slide structure from an entrance of the slide structure and is confined to slide relative to the slide structure so as to be blocked at a stop position of the slide structure, the two positioning bosses are embedded in the two positioning indentations respectively so that the object can be fixed on the wall stably. Therefore, the wall mount assembly simplifies the wall-mount operation of the object and provides a stable wall-mount effect.

24 Claims, 8 Drawing Sheets

WALL MOUNT ASSEMBLY

BACKGROUND OF THE INVENTION

1. Field of the Invention

The invention relates to a wall mount assembly, and especially relates to a wall mount assembly engaging an object on a wall in a detachable way.

2. Description of the Prior Art

Because current televisions are still heavy, for the wall mount stability of the televisions, a current wall mount frame is mounted on a wall by screws and a television is mounted on the wall mount frame by other screws. Such structure design can provide strong mounting structure, but the detachment and attachment of the television needs screwing a plurality of screws, which increases the inconvenience of the wall-mount operation. As to this, there are some wall mount frames designed in detachable engagement structure, of which the members are mounted on the television and the wall correspondingly. The television is hanged on the wall by a plurality of hook-engagement structures correspondingly disposed on the members. Such structure design can simplify the wall-mount operation; however, the structural strength of the wall mount frame is weakened. For general cases, in order to avoid a user holding a television for a longtime in a wall-mount operation, the engagement depth of the above hook-engagement structures generally is not deep, which leads to insufficient engagement strength for each hook-engagement structure, even to being disengaged. Furthermore, in order to compensate the insufficient engagement strength, the disposition quantity of the hook-engagement structures is hardly reduced, which leads to increasing the difficulty in the wall-mount operation to the user.

SUMMARY OF THE INVENTION

An objective of the invention is to provide a wall mount assembly, which uses a slide and a slider engaging with each other to obtain required engagement strength and simplification of wall-mount operation, so as to solve the problem in the prior art that the conventional wall mount frames are hardly designed to consider both structural strength and convenient operation for a long time.

The wall mount assembly of the invention is suitable for engaging an object on a wall in a detachable way. The wall mount assembly includes a first engagement member and a second engagement member. The first engagement member includes a slide structure, a first positioning indentation, and a second positioning indentation. The first positioning indentation and the second positioning indentation are oppositely disposed relative to the slide structure. The slide structure has an entrance and a stop position. The second engagement member includes a slider, a first positioning boss, and a second positioning boss. The first positioning boss and the second positioning boss are oppositely disposed relative to the slider. The first engagement member and the second engagement member are capable of being correspondingly disposed on the object and the wall. When the slider enters the slide structure from the entrance and is confined to slide relative to the slide structure so as to be blocked at the stop position, the first positioning boss and the second positioning boss are embedded in the first positioning indentation and the second positioning indentation respectively.

Therefore, in a practical wall-mount operation, a user just needs to slide the slider from the entrance into the slide structure. By the gravity of the object, the slider can slide to the stop position. The first positioning boss and the second positioning boss are also embedded in the first positioning indentation and the second positioning indentation respectively, so that the object obtains a three-point supporting and an orientating effect. Compared with the prior art, the wall mount assembly of the invention provide simple wall-mount operation. Required engagement strength thereof can be realized easily by deciding the engagement geometric dimension of the slider with the slide structure. Therefore, the invention can solve the problem in the prior art easily that the conventional wall mount frames are hardly designed to consider both structural strength and convenient operation for a long time.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
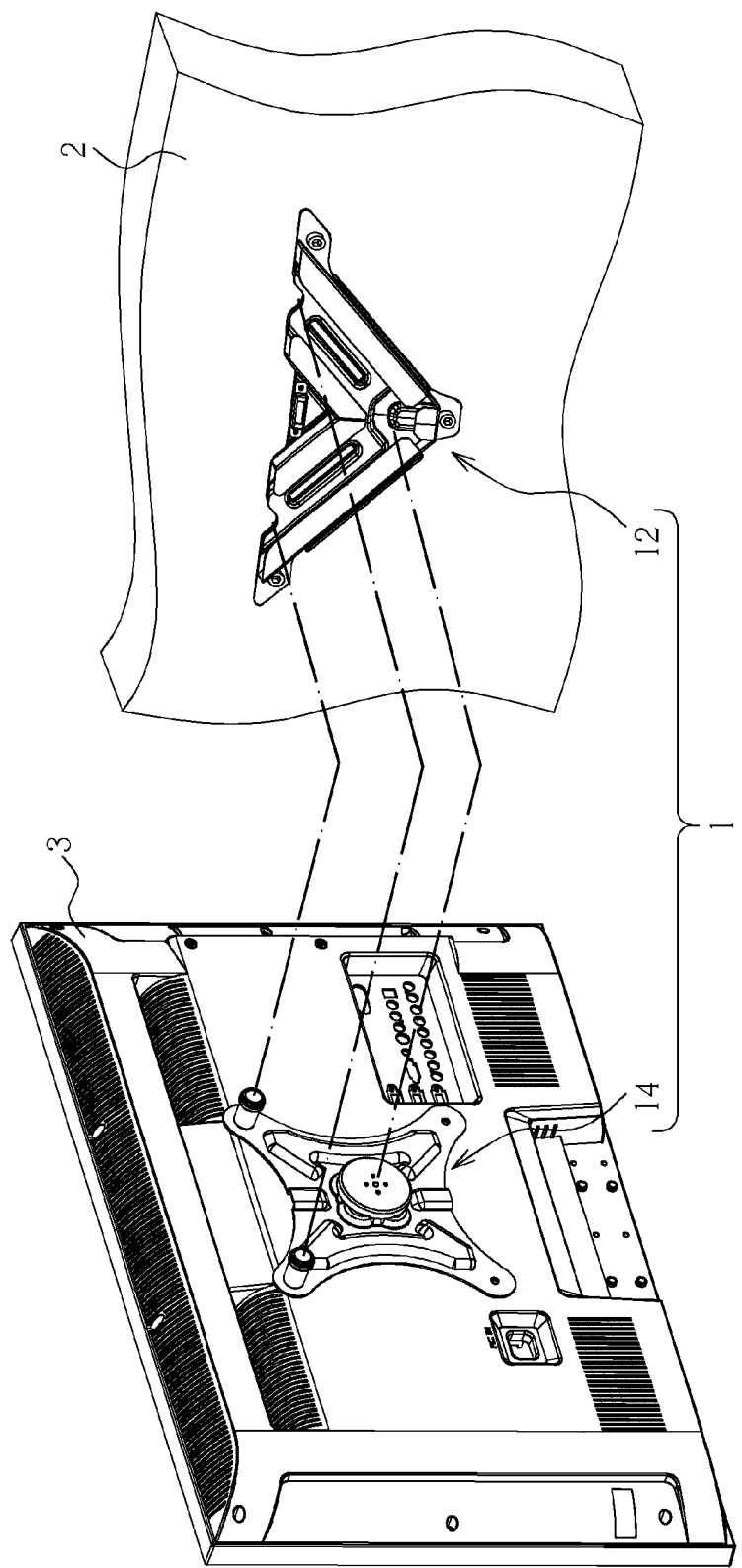
FIG. 1 is a schematic diagram illustrating disposition of a wall mount assembly of a preferred embodiment according to the invention.

Please refer to FIG. 1, which is a schematic diagram illustrating disposition of a wall mount assembly 1 of a preferred embodiment according to the invention. The wall mount assembly 1 includes a first engagement member 12 and the second engagement member 14. The first engagement member 12 is mounted on a wall 2. The second engagement member 14 is mounted on an object 3. In the embodiment, the object 3 is a television, but the invention is not limited thereto. By the wall mount assembly 1, the object 3 can be engaged in a detachable way onto the wall 2.

Figure 2:
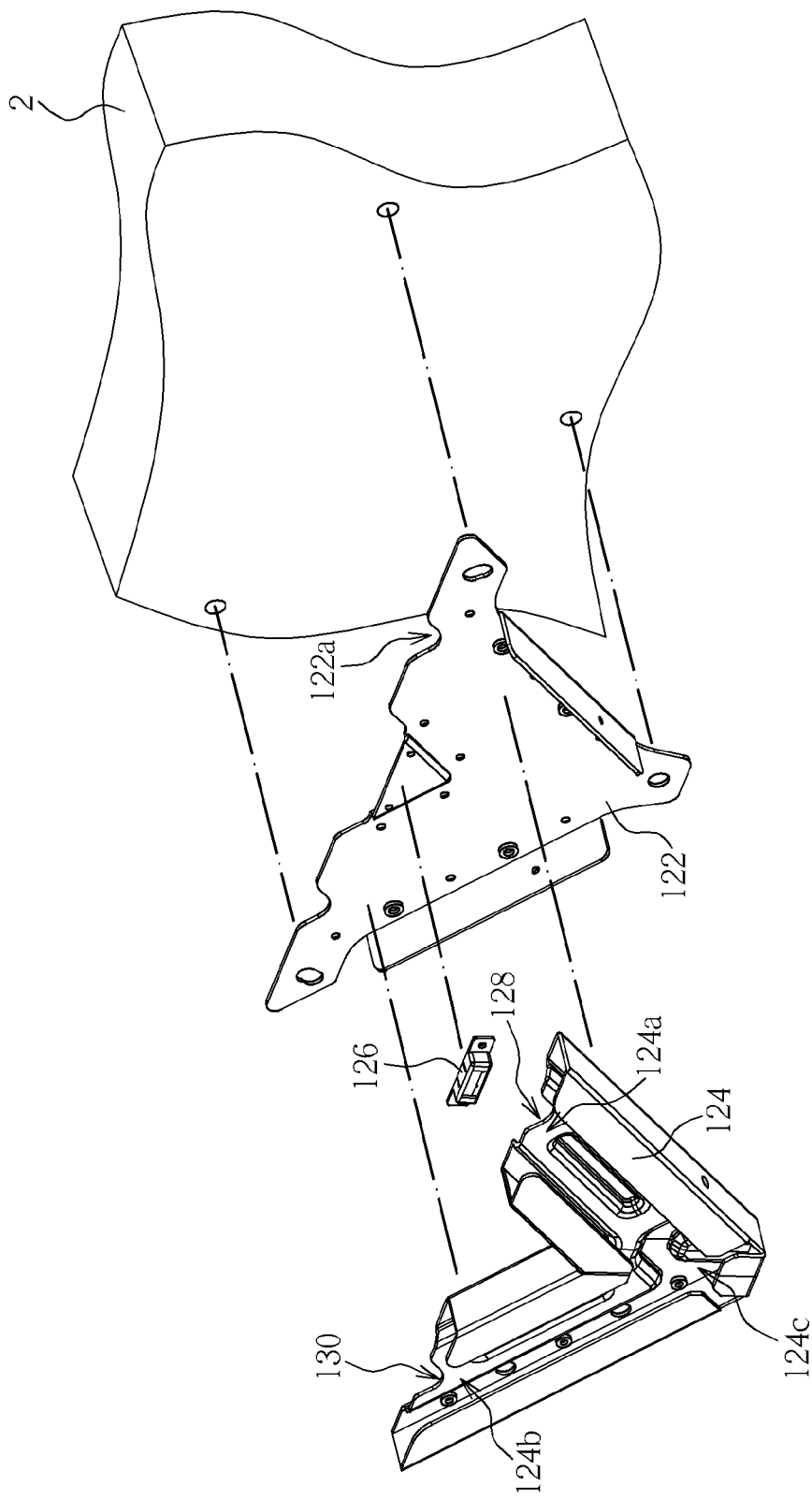
FIG. 2 is an exploded view of a first engagement member of the wall mount assembly in FIG. 1.

Please refer to FIG. 1 and FIG. 2. FIG. 2 is an exploded view of the first engagement member 12. The first engagement member 12 includes a first fixing mount 122, a slide structure 124, a level gauge 126, and a first positioning indentation 128 and a second positioning indentation 130 formed on the slide structure 124. In a practical product, the slide structure 124 and the level gauge 126 are mounted on the first fixing mount 122 by screws or other methods (such as welding) in factory in advance. Then, a user can mount the first fixing mount 122 on the wall 2 by expansion blots. The first engagement member 12 is therefore firmly mounted on the wall 2. Therein, the levelness of the first fixing mount 122 on the wall 2 can be realized by the level gauge 126. In the embodiment, the first engagement member 12 is formed by a sheet metal member. Therein, the slide structure 124 with a V-shaped profile is formed by combining two metal sheets; the first fixing mount 122 is a single sheet metal. Forming the first engagement member 12 by metal sheets can save material and reduce manufacturing cost with the requirement for the structural strength of the first engagement member 12. However, the invention is not limited thereto. In addition, the slide structure 124 has a first entrance 124a, a second entrance 124b, and a stop position 124c. The first entrance 124a and the second entrance 124b are located at the two ends of the V-shaped profile respectively. The stop position 124c is located at the vertex of the V-shaped profile. In the embodiment, the first positioning indentation 128 and the second positioning indentation 130 are formed directly on the slide structure 124 and are located at the first entrance 124a and the second entrance 124b; however, the invention is not limited thereto.

Figure 3:
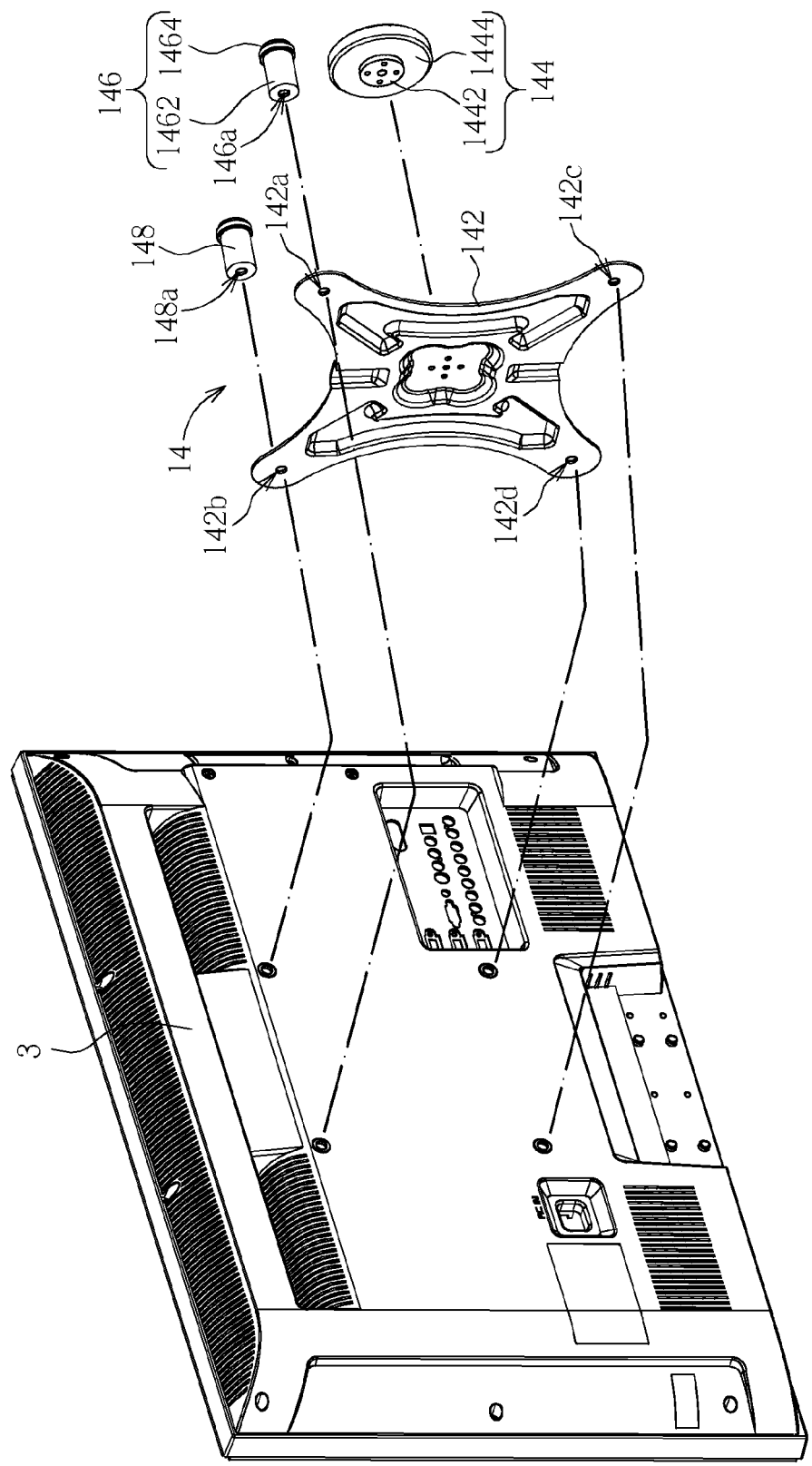
FIG. 3 is an exploded view of a second engagement member of the wall mount assembly in FIG. 1.

Please refer to FIG. 1 and FIG. 3. FIG. 3 is an exploded view of the second engagement member 14; therein, the object 3 is shown in size reduction for simplification of drawing reading. The second engagement member 14 includes a second fixing mount 142, a slider 144, a first positioning boss 146, and a second positioning boss 148. The slider 144, the first positioning boss 146, and the second positioning boss 148 are disposed on the second fixing mount 142. In a practical product, the slider 144, the first positioning boss 146, and the second positioning boss 148 is mounted on the second fixing mount 142 by screws or other methods (such as welding) in factory in advance; therein, the first positioning boss 146 and the second positioning boss 148 are oppositely disposed relative to the slider 144. Then, the user can mount the second fixing mount 142 on the object 3 by screws. The second engagement member 14 is therefore firmly mounted on the object 3. In the embodiment, the second fixing mount 142 is a sheet metal member. The slider 144 can be formed by use of a lathe in practice. The first positioning boss 146 and the second positioning boss 148 can be realized by sleeves. However, the invention is not limited thereto. The slider 144 includes a connection portion 1442 and a disk portion 1444. The slider 144 is mounted on the central portion of the second fixing mount 142 by screws. In the embodiment, the thickness of the connection portion 1442 is slightly larger than the material thickness of the slide structure 124 in principle, so that the disk portion 1444 can slide in the slide structure 124 smoothly. The first positioning boss 146 and the second positioning boss 148 are mounted in holes 142a and 142b of the second fixing mount 142 relative to the slider 144, for example by tight fitting, screwing or welding. The first positioning boss 146 and the second positioning boss 148 have fixing holes 146a and 148a respectively. The second fixing mount 142 is mounted on the object 3 by screws through the fixing holes 146a and 148a and the holes 142c and 142d.

Figure 4:
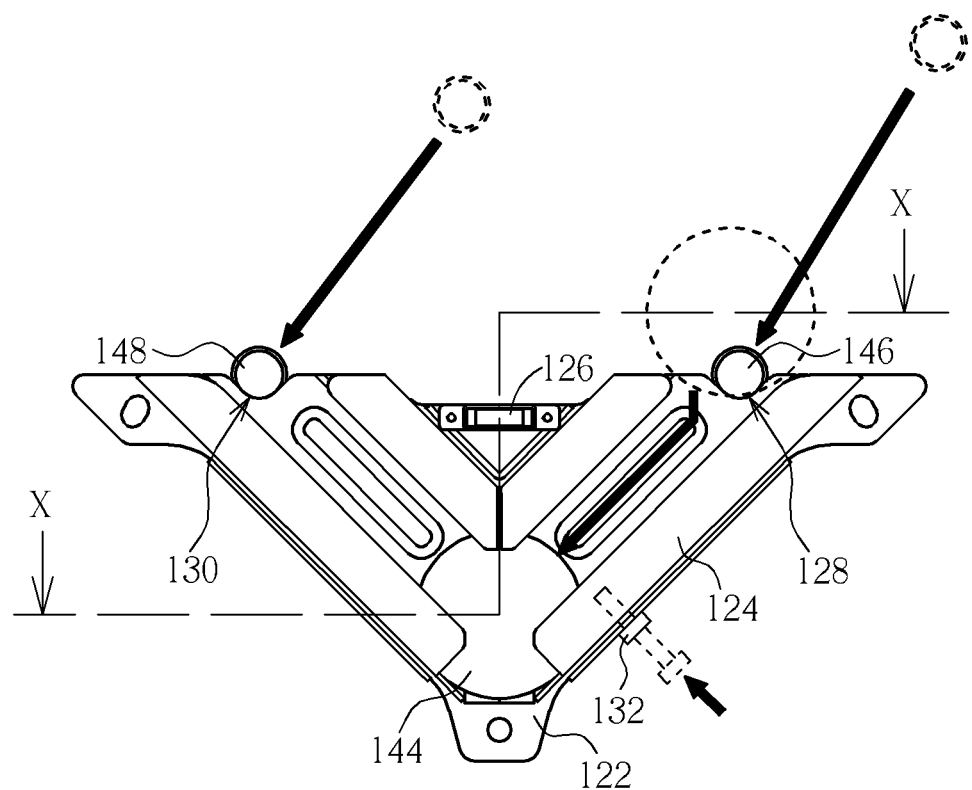
FIG. 4 is a schematic diagram illustrating engagement action of the first engagement member with the second engagement member of the wall mount assembly in FIG. 1.

Please refer to FIG. 1 and FIG. 4. FIG. 4 is a schematic diagram illustrating engagement action of the first engagement member 12 with the second engagement member 14; therein, for simple illustration, the wall 2 and the object 3 are not shown herein. The second engagement member 14 is shown only by the slider 144, the first positioning boss 146, and the second positioning boss 148. During wall-mount operation of the object 3, the user holds the object 3 to align the slider 144 with the first entrance 124a, such that the disk portion 1444 of the slider 144 can enter the slide structure 124 from the first entrance 124a, as shown by bold lines. The disk portion 1444 is a circular structure having a guiding effect, so in practice, the user can put the disk portion 1444 into the slide structure 124 without any excessive alignment, which greatly reduces the difficulty and time of the alignment operation. Furthermore, when the disk portion 1444 starts to enter the slide structure 124, it is unnecessary to keep the object 3 horizontal, which is conducive to holding the object 3 in an easy posture for the user. Afterward, the user can make the object 3 move downward in compliance with the gravity of the object 3. The disk portion 1444 is therefore confined to slide in the slide structure 124 until the disk portion 1444 is blocked by the slide structure 124 at the stop position 124c. In a general configuration, the second engagement member 14 is disposed in the first engagement member 12 by use of the gravity of the object 3, so during the above downward movement of the object 3, the user can easily keep the object 3 not too slanted. Therefore, when the disk portion 1444 is blocked at the stop position 124c, the first positioning boss 146 and the second positioning boss 148 are also automatically embedded in the first positioning indentation 128 and the second positioning indentation 130 respectively.

Figure 5:
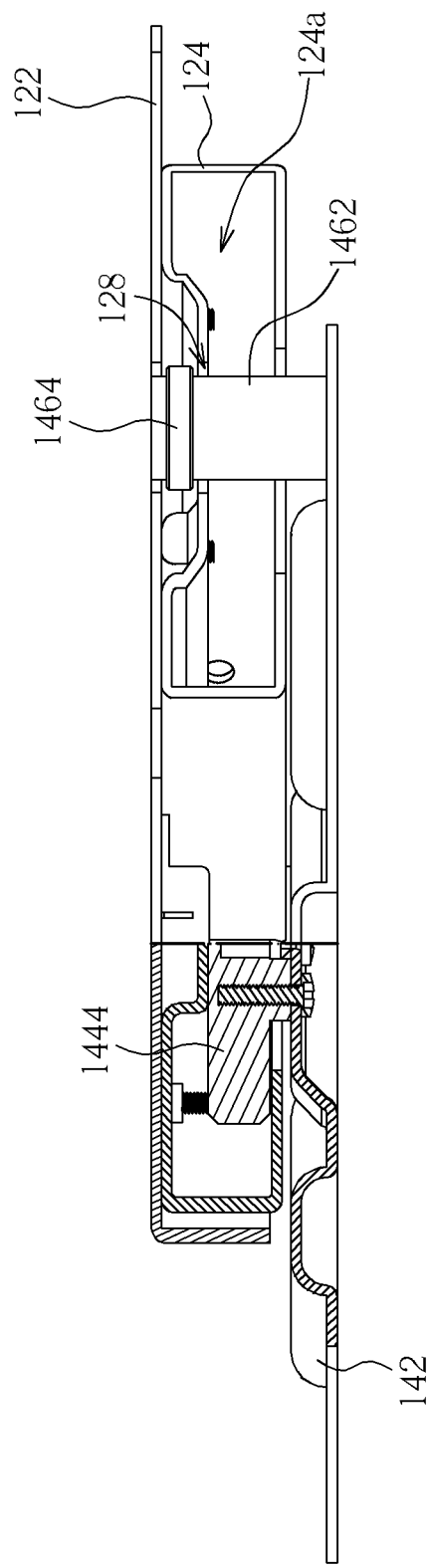
FIG. 5 is a sectional view of the wall mount assembly in FIG. 1 after having being engaged.

Please refer to FIG. 4 and FIG. 5. FIG. 5 is a sectional view of the wall mount assembly 1 having being engaged along the line X-X in FIG. 4. The first positioning boss 146 includes a boss body 1462 and a boss head 1464. The boss body 1462 is connected to the second fixing mount 142. When the first positioning boss 146 is embedded in the first positioning indentation 128, the first positioning indentation 128 accommodates the boss body 1462 and is capable of holding the boss head 1464. It is added that in the embodiment, the first fixing mount 122 forms a relief space 122a (shown in FIG. 2) corresponding to the first positioning indentation 128, so as to avoid structural interference of the first positioning boss 146 with the first fixing mount 122. However, the invention is not limited thereto. Furthermore, in the embodiment, the first positioning boss 146 and the second positioning boss 148 are identical in structure, so the above description of the first positioning boss 146 is also applied to the second positioning boss 148 and is not repeated therefor.

In the embodiment, when the disk portion 1444 is blocked at the stop position 124c, and the first positioning boss 146 and the second positioning boss 148 are embedded in the first positioning indentation 128 and the second positioning indentation 130 respectively, the object 3 can obtain a three-point supporting and an orientating effect by the slider 144, the first positioning boss 146, and the second positioning boss 148. Because a V-shaped sliding path formed by the slide structure 124 has an effect that the slider 144 tends to stop at the stop position 124c, once the first engagement member 12 and the second engagement member 14 are engaged completely, the object 3 is therefore firmly mounted on the wall 2. Even though any vibration such as an earthquake or an impact occurs, the object 3 still can be back to the stop position 124c automatically. It shows the reliable engagement of the wall mount assembly 1. In the embodiment, for further enhancing the positioning effect on the slider 144, a fixing part 132 (shown in FIG. 4) such as a screw can be disposed near the stop position 124c of the slide structure 124. After the first engagement member 12 and the second engagement member 14 are engaged completely, the fixing part 132 can be screwed to pass into the slide structure 124 for preventing the slider 144 from escaping from the slide structure 124, so as to obtain a locking effect on the slider 144. In practice, the locking effect can be obtained alternatively by screwing the fixing part 132 to push against the slider 144.

It is added that in the embodiment, the slider 144, the first positioning boss 146, and the second positioning boss 148 respective provide weight supporting to the object 3, but the invention is not limited thereto. For example, the object 3 can be supported mostly by the slider 144, and the first positioning boss 146 and the second positioning boss 148 are used just for maintaining the levelness of the object 3. Furthermore, in the embodiment, the first positioning boss 146 and the second positioning boss 148 are disposed relative to the slider 144.

The first positioning indentation 128 and the second positioning indentation 130 are also oppositely disposed relative to the slide structure 124. However, the invention is not limited thereto. In principle, the positioning effect can be obtained by correspondingly disposing the first positioning boss 146, the second positioning boss 148, the first positioning indentation 128, and the second positioning indentation 130 just relative to the slide structure 124 (or the slider 144), not limited to be at the same horizontal level. Furthermore, in the embodiment, the first positioning indentation 128 and the second positioning indentation 130 are formed by being integrated directly into the structure of the slide structure 124, but the invention is not limited thereto. For example, the positioning indentations can be formed by additional members or by the first fixing mount 122; the disposition thereof is not limited to be close to the first entrance 124a and the second entrance 124b.

Figure 6:
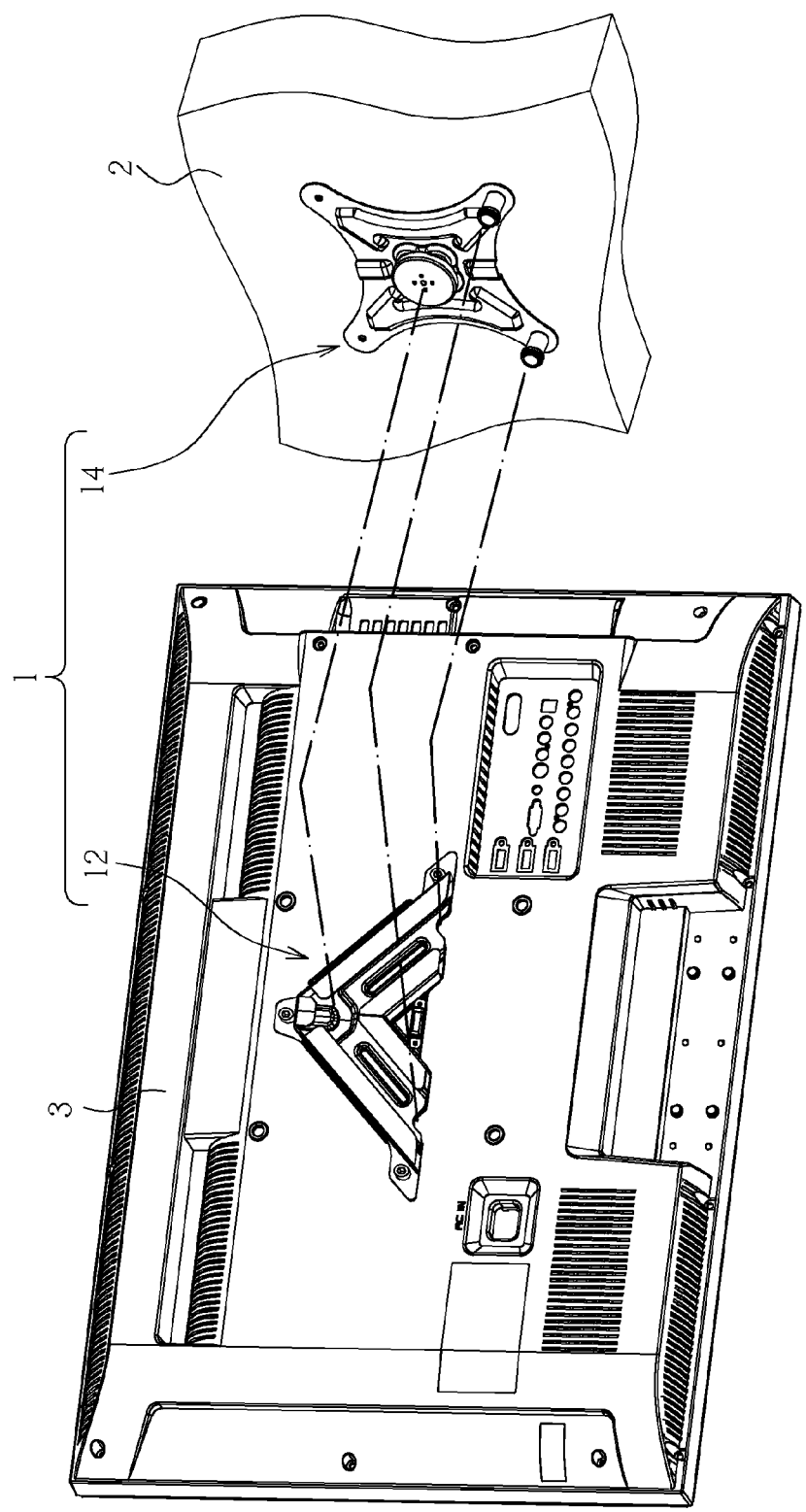
FIG. 6 is a schematic diagram illustrating disposition of a wall mount assembly according to another embodiment.
Figure 7:
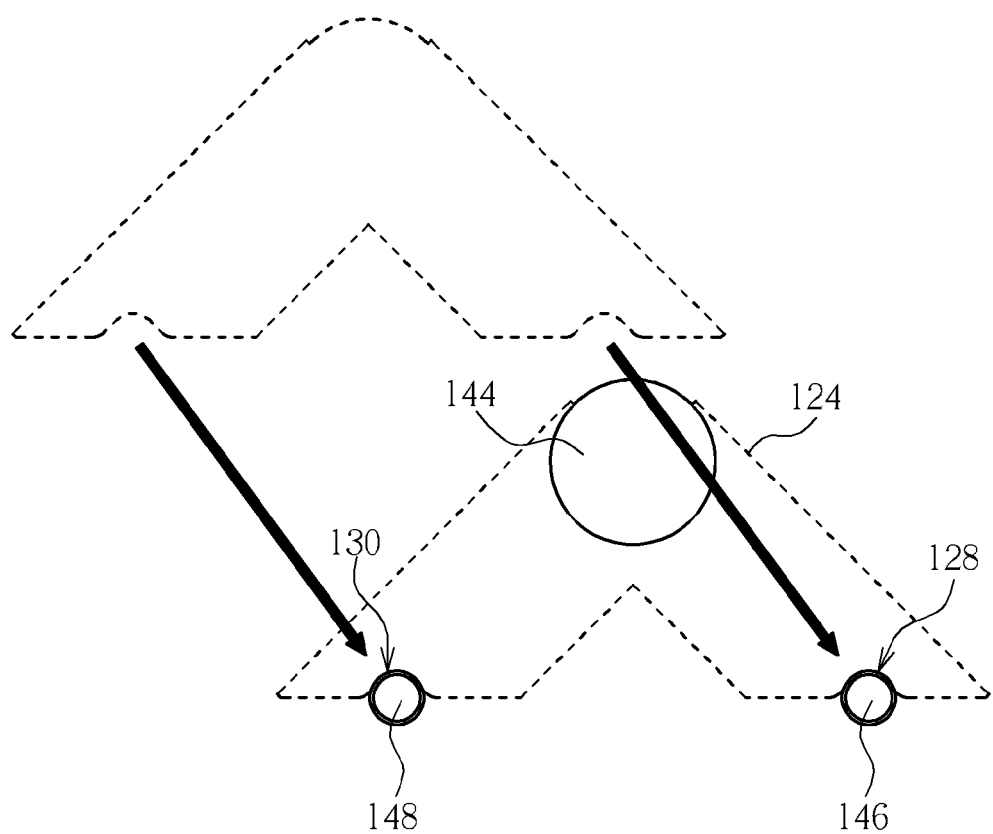
FIG. 7 is a schematic diagram illustrating engagement action of the wall mount assembly in FIG. 6.

It is added that in the above embodiment, the slide structure 124 is provided in a V-shaped symmetrical structure, so in a practical wall-mount operation, the slider 144 can enter the slide structure 124 from the second entrance 124b alternatively and be confined to slide relative to the slide structure 124 so as to be blocked at the stop position 124c, which is described again herein. In addition, in the above embodiment, the slide structure 124 is mounted on the wall 2, but the invention is not limited thereto. Please refer to FIG. 6 and FIG. 7. FIG. 6 is a schematic diagram illustrating disposition of a wall mount assembly 1 according to another embodiment. FIG. 7 is a schematic diagram illustrating engagement action of the first engagement member 12 with the second engagement member 14 in FIG. 6. Therein, for simple illustration, the wall 2 and the object 3 are not shown herein, the first engagement member 12 is shown by the slide structure 124 by dashed lines, and the second engagement member 14 is shown by the slider 144, the first positioning boss 146, and the second positioning boss 148.

In the embodiment, the first engagement member 12 is mounted on the object 3. The second engagement member 14 is mounted on the wall 2. In view of the engagement principle of the first engagement member 12 and the second engagement member 14, the first engagement member 12 and the second engagement member 14 need to be turned by 180 degrees for disposition. In a practical wall-mount operation, the user can hold the object 3 to align the first entrance 124a with the slider 144, such that the slider 144 can enter the slide structure 124 from the first entrance 124a. Afterward, the user can make the object 3 together with the slide structure 124 move downward in compliance with the gravity of the object 3. The slider 144 is therefore confined to slide relatively in the slide structure 124 until the slide structure 124 blocks the slider 144 at the stop position 124c. The first positioning indentation 128 and the second positioning indentation 130 are embedded in the first positioning boss 146 and the second positioning boss 148 respectively. For other description of the disposition and engagement of the first engagement member 12 and the second engagement member 14, please refer to the relational description in the above description. It will not be described herein.

Figure 8:
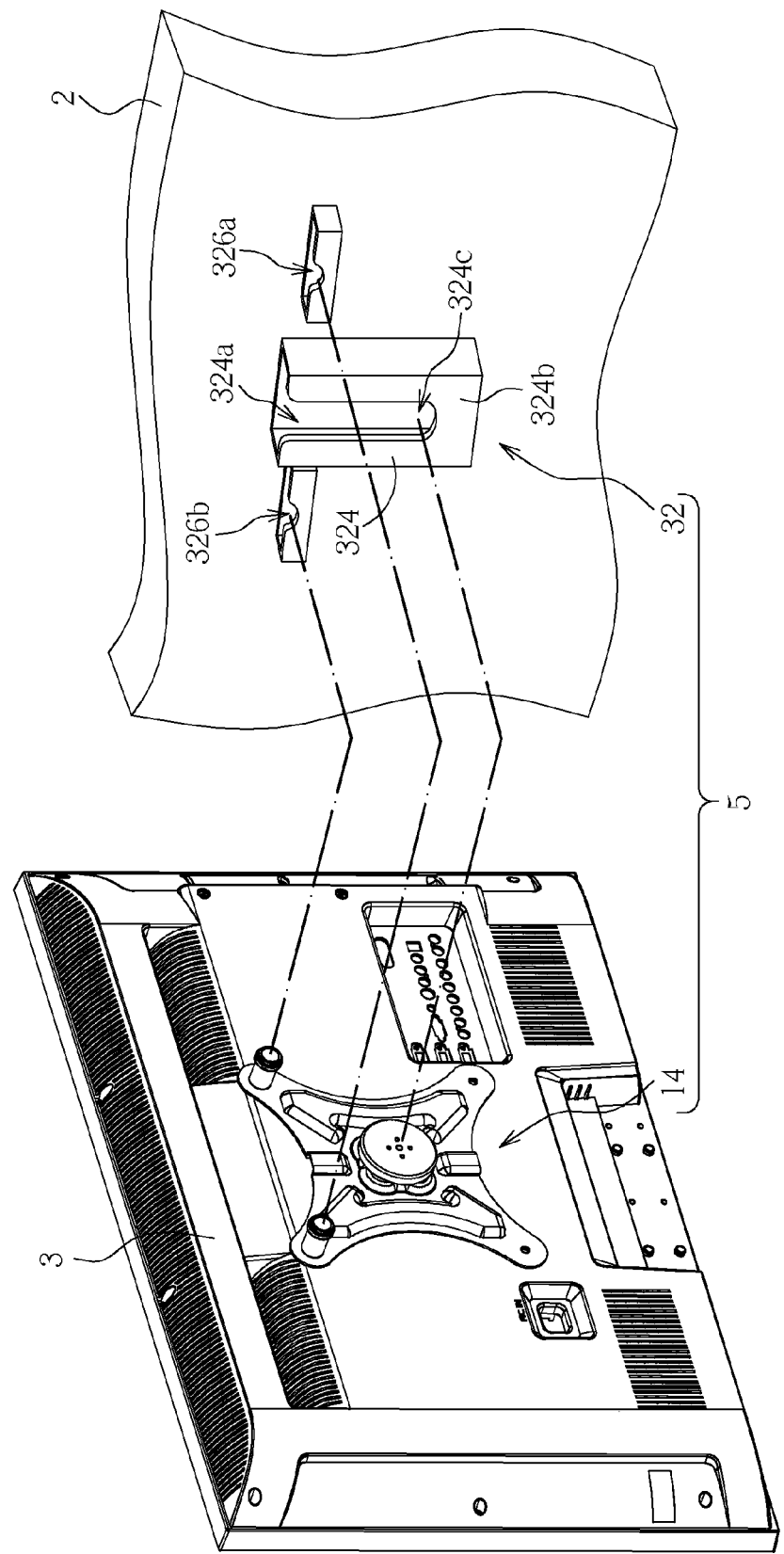
FIG. 8 is a schematic diagram illustrating disposition of a wall mount assembly according to another embodiment.

In the above embodiments, the slide structure 124 is designed of V-shaped symmetrical structure, but the invention is not limited thereto. Besides, the slide structure of the invention is not limited to having several entrances. Please refer to FIG. 8, which is a schematic diagram illustrating disposition of a wall mount assembly 5 according to another embodiment. In the embodiment, the difference between the wall mount assembly 5 and the wall mount assembly 1 is mainly that a first engagement member 32 of the wall mount assembly 5 is provided with a slide structure 324 having a single linear slot, and that a first positioning indentation 326a and a second positioning indentation 326b are not formed directly on the slide structure 324 but formed by independent members. The slide structure 324 has only one entrance 324a and a closed end 324b. The stop position 324c is disposed at the top of the closed end 324b. For the disposition, wall-mount operation and variant of the wall mount assembly 5, please refer to the relational description of the above embodiments. It will not be described herein. In addition, the slide structure 324 in FIG. 8 is disposed vertically, but the invention is not limited thereto. In practice, the slide structure 324 can be designed to be a slanted slot, so as to reduce the impact of the slider 144 on the closed end 324b after entering the slide structure 324.

As discussed above, the wall mount assembly of the invention is designed of slot structure. The engagement strength of the slider with the slide structure is much larger than that a conventional engagement structure can provide. Besides, in a wall-mount operation, the user just needs to align the slider with the entrance of the slide structure; then, the slider can proceed to slide in the slide structure. After moving for a distance, the slider is blocked stably at the stop position of the slide structure, which effectively avoids the object falling from the wall after the wall-mount operation is completed. Furthermore, the wall mount assembly of the invention is designed of automatically positioning. In principle, when the slider is blocked at the stop position, the positioning bosses relatively disposed are therefore embedded in the positioning indentations. Thereby, during the wall-mount operation, the user does not need to strenuously position the object, so as to effectively reduce the wall-mount operation. Therefore, the wall mount assembly of the invention achieves required engagement strength and simplification of wall-mount operation, so as to solve the problem in the prior art that the conventional wall mount frames are hardly designed to consider both structural strength and convenient operation for a long time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wall mount assembly suitable for engaging an object on a wall in a detachable way, the wall mount assembly comprising:
   a first engagement member comprising a slide structure, a first positioning indentation, and a second positioning indentation, the first positioning indentation and the second positioning indentation being oppositely disposed relative to the slide structure, the slide structure having a first entrance and a stop position; and
   a second engagement member comprising a slider, a first positioning boss, and a second positioning boss, the slider comprising a disk portion, the first positioning boss and the second positioning boss being oppositely disposed relative to the slider;
   wherein the first engagement member and the second engagement member are capable of being correspondingly disposed on the object and the wall, and when the slider enters the slide structure from the first entrance and is confined by the disk portion to slide in the slide structure so as to be blocked at the stop position, the first positioning boss and the second positioning boss are embedded in the first positioning indentation and the second positioning indentation respectively.

2. The wall mount assembly of claim 1, wherein the slide structure has a closed end, and the stop position is located at the closed end.

3. The wall mount assembly of claim 1, wherein the first engagement member further comprises a fixing part passing into the slide structure so as to prevent the slider from escaping from the slide structure.

4. The wall mount assembly of claim 1, wherein the slide structure is provided in a V-shaped profile, and the stop position is located at a vertex of the V-shaped profile.

5. The wall mount assembly of claim 4, wherein the slide structure has a second entrance, and the first entrance and the second entrance are located at two ends of the V-shaped profile respectively.

6. The wall mount assembly of claim 5, wherein the first positioning indentation and the second positioning indentation are formed at the first entrance and the second entrance respectively.

7. The wall mount assembly of claim 1, wherein the first positioning boss comprises a boss body and a boss head, and when the first positioning boss is embedded in the first positioning indentation, the first positioning indentation accommodates the boss body and is capable of holding the boss head.

8. The wall mount assembly of claim 1, wherein the first engagement member further comprises a first fixing mount and a level gauge, the slide structure and the level gauge are disposed on the first fixing mount, the first positioning indentation and the second positioning indentation are formed on the slide structure, and the first engagement member is mounted on the wall by the first fixing mount.

9. The wall mount assembly of claim 1, wherein the second engagement member further comprises a second fixing mount, the slider, the first positioning boss, and the second positioning boss are disposed on the second fixing mount, and the second engagement member is mounted on the object by the second fixing mount.

10. The wall mount assembly of claim 1, wherein the first engagement member is a sheet metal member.

11. A wall mount assembly suitable for engaging an object on a wall in a detachable way, the wall mount assembly comprising:
- a first engagement member comprising a slide structure, a first positioning indentation, and a second positioning indentation, the first positioning indentation and the second positioning indentation being oppositely disposed relative to the slide structure, the slide structure having a first entrance and a stop position; and
- a second engagement member comprising a slider, a first positioning boss, and a second positioning boss, the first positioning boss and the second positioning boss being oppositely disposed relative to the slider, the first positioning boss comprising a boss body and a boss head;

wherein the first engagement member and the second engagement member are capable of being correspondingly disposed on the object and the wall, when the slider enters the slide structure from the first entrance and is confined to slide relative to the slide structure so as to be blocked at the stop position, the first positioning boss and the second positioning boss are embedded in the first positioning indentation and the second positioning indentation respectively, and the first positioning indentation accommodates the boss body and holds the boss head.

12. The wall mount assembly of claim 11, wherein the slide structure has a closed end, and the stop position is located at the closed end.

13. The wall mount assembly of claim 11, wherein the first engagement member further comprises a fixing part passing into the slide structure so as to prevent the slider from escaping from the slide structure.

14. The wall mount assembly of claim 11, wherein the slide structure is provided in a V-shaped profile, and the stop position is located at a vertex of the V-shaped profile.

15. The wall mount assembly of claim 14, wherein the slide structure has a second entrance, and the first entrance and the second entrance are located at two ends of the V-shaped profile respectively.

16. The wall mount assembly of claim 15, wherein the first positioning indentation and the second positioning indentation are formed at the first entrance and the second entrance respectively.

17. The wall mount assembly of claim 11, wherein the first engagement member further comprises a first fixing mount and a level gauge, the slide structure and the level gauge are disposed on the first fixing mount, the first positioning indentation and the second positioning indentation are formed on the slide structure, and the first engagement member is mounted on the wall by the first fixing mount.

18. The wall mount assembly of claim 11, wherein the second engagement member further comprises a second fixing mount, the slider, the first positioning boss, and the second positioning boss are disposed on the second fixing mount, and the second engagement member is mounted on the object by the second fixing mount.

19. The wall mount assembly of claim 11, wherein the first engagement member is a sheet metal member.

20. A wall mount assembly suitable for engaging an object on a wall in a detachable way, the wall mount assembly comprising:
- a first engagement member comprising a slide structure, a first positioning indentation, and a second positioning indentation, the first positioning indentation and the second positioning indentation being oppositely disposed relative to the slide structure, the slide structure being provided in a V-shaped profile and having a first entrance, a second entrance, and a stop position, the first entrance and the second entrance being located at two ends of the V-shaped profile respectively, the stop position being located at a vertex of the V-shaped profile, the first positioning indentation and the second positioning indentation are formed at the first entrance and the second entrance respectively; and
- a second engagement member comprising a slider, a first positioning boss, and a second positioning boss, the first positioning boss and the second positioning boss being formed oppositely relative to the slider;

wherein the first engagement member and the second engagement member are capable of being correspondingly disposed on the object and the wall, and when the slider enters the slide structure from the first entrance and is confined to slide relative to the slide structure so as to be blocked at the stop position, the first positioning boss and the second positioning boss are embedded in the first positioning indentation and the second positioning indentation respectively.

21. The wall mount assembly of claim 20, wherein the first engagement member further comprises a fixing part passing into the slide structure so as to prevent the slider from escaping from the slide structure.

22. The wall mount assembly of claim 20, wherein the first engagement member further comprises a first fixing mount and a level gauge, the slide structure and the level gauge are disposed on the first fixing mount, the first positioning indentation and the second positioning indentation are formed on the slide structure, and the first engagement member is mounted on the wall by the first fixing mount.

23. The wall mount assembly of claim 20, wherein the second engagement member further comprises a second fixing mount, the slider, the first positioning boss, and the second positioning boss are disposed on the second fixing mount, and the second engagement member is mounted on the object by the second fixing mount.

24. The wall mount assembly of claim 20, wherein the first engagement member is a sheet metal member.

* * * * *